United States Patent [19]

Boroschewski et al.

[11] 3,862,163

[45] Jan. 21, 1975

[54] PHENOXYCARBOXYLIC ACID AMIDES

[75] Inventors: Gerhard Boroschewski, Berlin; Friedrich Arndt, Aich, both of Germany

[73] Assignee: Schering AG, Bergkamen, Germany

[22] Filed: Sept. 27, 1972

[21] Appl. No.: 292,674

[30] Foreign Application Priority Data
Oct. 14, 1971 Germany............................ 2151766
Feb. 10, 1972 Germany............................ 2206822

[52] U.S. Cl. ........ 260/306.7 T, 71/90, 260/306.8 R
[51] Int. Cl. ...................... C07d 91/26, C07d 91/34
[58] Field of Search ............... 260/306.8 R, 306.7 T

[56] References Cited
UNITED STATES PATENTS
3,717,651  2/1973  Pilgram et al................ 260/306.8 R OTHER PUBLICATIONS
Baker et al., Chem. Abstract, 71:46133, (1969).

*Primary Examiner*—R. J. Gallagher
*Attorney, Agent, or Firm*—Joseph F. Padlon

[57] ABSTRACT

Phenoxycarboxilic acid amides, are provided, being particularly effective against the growth of monocotyledonous weeds occurring in rice cultivation.

43 Claims, No Drawings

PHENOXYCARBOXYLIC ACID AMIDES

The invention concerns new phenoxycarboxylic acid amides, herbicides containing these compounds as active substances, as well as methods for the production of these compounds.

Phenoxycarboxylic acid derivatives with herbicidal action are known. These include, for example, 4-chlorophenoxyacetic acid, 2,4-dichlorophenoxyacetic acid, and 2,4,5-trichlorophenoxyacetic acid, as disclosed in German Pat. Nos. 915,876 and 940,946, as well as α-(4-chloro-2-methylphenoxy)-propionic acid as disclosed in German Pat. No. 1,064,286. It is to be noted that all of these compounds have been introduced in the practice with considerable success. As active substances for weed control there have further been proposed the corresponding amides of said acids, such as 2,4,5-trichlorophenoxy-acetamide. See French Pat. No. 927,223.

These derivatives, however, have the disadvantage of no or relatively insufficient action against monocotyledonous weed types, such as *Echinochloa crus galli*, which occur widely in rice cultivations.

It is, therefore, an object of the invention to develop an agent particularly effective against monocotyledonous weed types, in rice cultivations.

It has now been found that compounds of the general formula

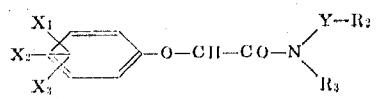

in which
  $R_1$ is hydrogen or methyl,
  $R_2$ H is hydrogen or lower alkyl,
  $R_3$ is hydrogen, a lower alkyl or lower alkenyl,
  $X_1$, $X_2$, and $X_3$ are equal or different and are hydrogen, lower alkyl, or halogen, and
  Y is thiazolyl or thiazolinyl,
are effective as herbicides and can be used particularly in controlling species of millet in rice cultivations.

By the substituents of the phenyl radical marked X in the general formula there must be understood that it includes alkyl radicals such as methyl, ethyl and others, as halogens such as chlorine, bromine and others.

The phenyl radical may be substituted identically or differently, but the 4 position, the 2,4 position, and the 2,4,5 position being the preferred positions.

Accordingly there may be named as suitable phenyl radicals for example the 4-chloro, the 2,4-dichloro, the 2,4,5-trichloro and the 2-methyl-4-chlorophenyl radical.

As aliphatic hydrocarbon radicals, there enter into consideration lower alkyl, such as methyl, ethyl or propyl, and lower alkenyl, such as allyl or butenyl.

The compounds according to the invention possess remarkable herbicidal properties. Thus, surprisingly, such weeds can be controlled with them in flood cultivations of rice as are unresponsive to the known herbicidal phenoxycarboxylic acid derivatives. This specific effectiveness extends to Echinochloa crus galli, and others which are destroyed without damage to the rice plants.

It should be stressed in this connection that this extremely harmful weed can be controlled with a treatment even to the third leaf stage, while known herbicides of a similar direction of action are effective only before or a short time after the emergence of the seeds.

For the above reasons, compounds according to the invention with their application up to several weeks after the transplanting time offer a far larger treatment period than known herbicides.

Moreover, numerous other weeds can also be controlled, of which the following may be named as examples: *Stellaria media*, *Senecio vulgaris*, *Matricaria chamomilla*, *Lamium amplexicaule*, *Ipomoea purpurea*, *Polygonum lapathifolium*, *Centaurea cyanus*, *Amaranthus retroflexus*, *Chrysanthemum segetum* and *Setaria italica*.

Depending on the constitution and method of application, many of the compounds of the invention, furthermore are tolerated also by other crop plants, such as corn and potatoes, without plant damage.

The quantities used are about 0.5 to 3 kg of active substance per hectare, depending on area of application and type of weed.

The compounds of the invention can be used either alone or in mixture with each other or with other active substances. In addition, but not necessarily, other plant protection or pest control agents, such as fungicides, nematocides or other agents may be added according to the desired purpose. Also an addition of fertilizers may be feasible.

If the spectrum of action of the compounds herein is intended, other herbicides may be added, although then, of course, the selectivity is not always maintained. As herbicidally active mixture partners that are suitable, there may be included active substances from the groups of the carbamidic acid and thiocarbamidic acid esters of the substituted anilines and anilides, triazines, amino-triazoles, diazines, uracils, such as 3-cyclohexyl-5,6-trimethylene uracil, 1-phenyl-4-amino-5-chloropyridazone(6), aliphatic carboxylic acids and halogen carboxylic acids, halogenized benzoic acids and phenylacetic acids, aryloxycarboxylic acids, hydrazides, amides, nitriles, halogen carboxylic acids, like 2,2-dichloropropionic acid or the salts thereof, tetrafluoropropionic acid or the salts thereof, esters of such carboxylic acids, ureas, 2,3,6-trichlorobenzyloxypropanol, thiocyanogen-containing agents, ethers, particularly substituted diphenyl ethers, benzimidazoles, quinazolines, dipyridylium derivatives, substituted oxadiazines and oxadiazolines, substituted thiadiazoles and thiadiazines, as well as benzoxazines and the like.

Depending on the purpose of application, other substances may also be added, by which it must be understood that non-phytotoxid additions which may give a synergistic effect with herbicides are wetting agents, emulsifiers, solvents, oily additions, and the like.

Advantageously, the active substances according to the invention or their mixtures are employed in the form of preparations, such as powders, scatters, granulates, solutions, emulsions or suspensions, with the addition of liquid and/or solid vehicles or diluents and optionally wetting, adhesive, emulsifying and/or dispersing aids.

Suitable liquid vehicles are water, aliphatic and aromatic hydrocarbons, such as benzene, toluene, xylene, cyclohexanone, isophorone, also mineral oil fractions, and the like.

As solid vehicles, there are included suitable mineral earths, like silicious clay, silica gel, talcum, kaolin, attaclay, limestone, silicic acid and plant products, like flours.

Among surface-active substances, there should be included calcium lignin sulfonate, polyoxyethyleneoctylphenol ether, naphthalene sulfonic acies and their salts, phenosulfonic acids and their salts, formaldehyde condensates, fat alcohol sulfates, and substituted benzenesulfonic acids and their salts.

The percentage of active substance(s) in the various preparations may vary within wide limits: For example the compounds may contain about 20 to 80 percent by weight of active substances, about 80 to 20 percent by weight of liquid or solid vehicle and optionally up to 20 percent by weight of surfaceactive substances.

The application of the products can occur in the usual manner, e.g. with water as vehicle in spray solution quantities of 100 to 1000 liter/ha. Spray solution quantities of more than 1000 liter/ha that may be required for total weed control may be applied. Use of the product in the so-called "ultra low volume method" is as possible as their application in the form of socalled microgranulates.

The compounds according to the invention can be produced by usual known methods such as by acylation of 2-aminothiazole or 2-aminothiazoline derivatives with acid halides, acid anhydrides or acid esters.

The following examples will explain the production of the compounds of the invention.

1. N-thiazolyl-(2)-4-chlorophenoxyacetamide

Into a solution of 9.13 g of 2-aminothiazole and 11.1 ml of triethylamine in 150 ml of tetrahydrofurane there are dropped while stirring 16.4 g (0.08 mole) of 4-chlorophenoxyacetyl chloride. After completion of the reaction, 300 ml of water are added, and the product is thoroughly stirred, suction filtered, and then washed with water.

M.P.: 149°–150° C
Yield: 20.6 g = 93% of the theory

2. N-thiazolyl-(2)-α-(2-methyl-4-chlorophenoxy)-propionic acid amide 3.29 g (0.008 mole) of α-(2-methyl-4-chlorophenoxy)-propionic acid anhydride and 2.0 g of 2-aminothiazole are boiled for 30 minutes in about 20.0 ml of tetrahydrofurane. After evaporation of the tetrahydrofurane, the residue is dissolved in acetic acid ester and water, the organic phase is then washed with dilute sodium hydroxide solution and dilute hydrochloric acid, dried with magnesium sulfate, and evaporated under reduced pressure. The residue crystallizes out of a small amount of isopropyl ether.

M.p.: 88°–91° C
Yield: 1.35 g = 57% of the theory

3. N-thiazolyl-(2)-α-(2-methyl-4-chlorophenoxy)-propionic acid-N-methylamide

Into a solution of 6.84 g (0.06 mole) of 2-methylaminothiazole and 7.7 ml of triethylamine in 100 ml of tetrahydrofurane there are added while stirring, 11.65 g (0.05 mole) of 2-(2-methyl-4-chlorophenoxy)-propionyl chloride, the temperature rising to 40° C. Agitation is continued at room temperature for another 30 minutes. Then the mix is poured into 500 ml of iced water, extracted with acetic acid ester, and the organic phase is washed with water, a little dilute hydrochloric acid, and then again with water. Then it is dried with magnesium sulfate, and evaporated under reduced pressure.

M.p.: 68°–70° C
Yield: 13.5 g = 67% of the theory

Additional compounds according to the invention are listed in the following table.

| | Compounds according to invention | Physical Constant |
|---|---|---|
| 1. | N-Thiazolinyl-(2)-4-chlorophenoxy-acetamide | M.P. 179–180° C |
| 2. | N-Thiazolinyl-(2)-2,4-dichlorophenoxy-acetamide | M.P. 148–149° C |
| 3. | N-Thiazolinyl-(2)-α-(2,4-dichlorophenoxy)-propionic acid amide | M.P. 122–124° C |
| 4. | N-Thiazolinyl-(2)-2,4,5-trichlorophenoxyacetamide | M.P. 197–200° C |
| 5. | N-Thiazolinyl-(2)-(2-methyl-4-chlorophenoxy)-acetamide | M.P. 142–144° C |
| 6. | N-Thiazolinyl-(2)-α-(4-chlorophenoxy)-propionic acid amide | M.P. 122–123° C |
| 7. | N-Thiazolinyl-(2)-α-(2,4,5-trichlorophenoxy)-propionic acid amide | M.P. 171–172° C |
| 8. | N-Thiazolinyl-(2)-α-(2-methyl-4-chlorophenoxy)-propionic acid amide | M.P. 120° C |
| 9. | N-Thiazolyl-(2)-2,4-dichlorophenoxy-acetamide | M.P. 174–175° C |
| 10. | N-Thiazolyl-(2)-2,4,5-trichlorophenoxy-acetamide | M.P. 183–186° C |
| 11. | N-Thiazolyl-(2)-(2-methyl-4-chlorophenoxy)-acetamide | M.P. 160–161° C |
| 12. | N-Thiazolyl-(2)-α-(4-chlorophenoxy)-propionic acid amide | M.P. 145–146° C |
| 13. | N-Thiazolyl-(2)-α-(2,4-dichlorophenoxy)-propionic acid amide | M.P. 83–84.5° C |
| 14. | N-Thiazolyl-(2)-α-(2,4,5-trichlorophenoxy)-propionic acid amide | M.P. 122–124° C |
| 15. | N-Thiazolyl-(2)-4-chlorophenoxy acetic acid N-methylamide | M.P. 113–115° C |
| 16. | N-Thiazolyl-(2)-2,4-dichlorphenoxy acetic acid-N-methylamide | M.P. 102–103° C |
| 17. | N-4-Methyl-thiazolyl-(2)-4-chlorophenoxy-acetic acid amide | M.P. 92–93° C |
| 18. | N-4-Methyl-thiazolyl-(2)-2,4-dichlorophenoxy acetic acid amide | M.P. 88–89° C |
| 19. | N-4-Methyl-thiazolyl-(2)-(2-methyl-4-chlorophenoxy)-acetic acid amide | M.P. 139–140° C |
| 20. | N-4-methyl-thiazolyl-(2)-4-chlorophenoxy acetic acid-N-methylamide | M.P. 124–125° C |
| 21. | N-4-Methyl-thiazolyl-(2)-2,4-dichloro phenoxy acetic acid-N-methylamide | M.P. 156–157° C |

—Continued

| | Compounds according to invention | Physical Constant |
|---|---|---|
| 22. | N-4-Methyl-thiazolyl-(2)-(2-methyl-4-chlorophenoxy)-acetic acid-N-methylamide | M.P. 145–146° C |
| 23. | N-4-Methyl-thiazolyl-(2)-2,4-dichlorophenoxy acetic acid-N-ethylamide | M.P. 110–111° C |
| 24. | N-4-Methyl-thiazolyl-(2)-(2-methyl-4-chlorophenoxy)-acetic acid-N-ethylamide | M.P. 115–117° C |
| 25. | N-Thiazolyl-(2)-α-(2-methyl-4-chlorophenoxy)-propionic acid-N-methylamide | M.P. 68–70° C |
| 26. | N-4-Methyl-thiazolyl-(2)-α-(2,4-dichlorophenoxy)-propionic acid amide | M.P. 81–83° C |
| 27. | N-4-Methyl-thiazolyl-(2)-α-(2-methyl-4-chlorophenoxy)-propionic acid amide | $n_D^{20} = 1,5480$ |
| 28. | N-4-Methyl-thiazolyl-(2)-α-(2-methyl-4-chlorophenoxy)-propionic acid-N-methylamide | M.P. 53–55° C |
| 29. | N-4-Methyl-thiazolyl-(2)-α-(2-methyl-4-chlorophenoxy)-propionic acid-N-ethylamide | $n_D^{20} = 1,5523$ |
| 30. | N-4-Methyl-thiazolyl-(2)-α-(2-methyl-4-chlorophenoxy)=propionic acid-N-allylamide | $n_D^{20} = 1,5551$ |
| 31. | N-2-Thiazolinyl-(2)-4-chlorophenoxy acetic-acid-N-methylamide | M.P. 98–99° C |
| 32. | N-2-Thiazolinyl-(2)-2,4-dichlorophenoxy-acetic acid-N-methylamide | M.P. 122–123° C |
| 33. | N-Thiazolyl-(2)-2,4-dichlorophenoxy-acetic acid-N-methylamide | M.P. 103–104° C |
| 34. | N-Thiazolyl-(2)-2,4-dichlorophenoxy-acetic acid-N-allylamide | M.P. 63–66° C |
| 35. | N-4-Methyl-thiazolyl-(2)-2,4-dichlorophenoxy acetic acid-N-allylamide | M.P. 112–114° C |
| 36. | N-4-Methyl-thiazolyl-(2)-α-(2,4-dichlorophenoxy)-propionic acid-N-allylamide | $n_D^{20} = 1,5611$ |
| 37. | N-Thiazolyl-(2)-α-(2,4-dichlorophenoxy)-propionic acid-N-allylamide | $n_D^{20} = 1,5709$ |
| 38. | N-Thiazolyl-(2)-α-(2,4-dichlorophenoxy)-propionic acid-N-ethylamide | $n_D^{20} = 1,5859$ |

The above compounds are colorless and odorless crystalline substances, insoluble in water and gasoline, but soluble in acetone, tetrahydrofurane, dimethylformamide, cyclohexanone and isophorone.

The starting means for the production of the compounds are usually known in the art or can be produced by usual methods known in the art.

The following examples will illustrate the herbicidal action of the compounds of the invention in comparison with known herbicides.

EXAMPLE 1

The test plants listed below were treated in the greenhouse by the pre-emergence method with the agents to be used according to the invention, at a dose of 3 kg of active substance per hectare. The agents were sprayed uniformly as aqueous suspension in 500 liter/ha.

The findings show that the agents according to the invention have a broad action spectrum.

Legend from following table:

A - Compounds according to invention
B - Corn
C - Potato
D - Winter cabbage
E - Cauliflower
F - Sugar beet
G - Carrot
H - Onion
I - Cucumber
K - Alfalfa
L - Cotton
M - Chickweed
N - Milwort
O - Chamomile
P - Nettle
Q - Cornflower
R - Amaranth
S - Bindweed
T - Chicken millet
U - Italian millet

| A | B | C | D | E | F | G | H | I | K | L | M | N | O | P | Q | R | S | T | U |
|---|---|---|---|---|---|---|---|---|---|---|---|---|---|---|---|---|---|---|---|
| N-Thiazolinyl-(2)-4-chlorphenoxyacetamide | 9 | — | 0 | 0 | 0 | 0 | 0 | 0 | 0 | 0 | 0 | 0 | 0 | 0 | 0 | 0 | 0 | 0 | 0 |
| N-Thiazolinyl-(2)-2,4-dichlorphenoxyacetamide | 10 | 10 | 0 | 0 | 0 | 0 | 0 | 3 | 0 | — | 3 | 1 | 2 | 4 | 0 | 1 | — | — | — |
| N-Thiazolinyl-(2)-2,4,5-trichlorphenoxyacetamide | — | — | 0 | 0 | 0 | 0 | 0 | 0 | 0 | — | 0 | 0 | 0 | 0 | 0 | 0 | 0 | 0 | 0 |
| N-Thiazolinyl-(2)-(2-methyl-4-chlorphenoxy)-acetamide | 10 | — | 0 | 0 | 0 | 0 | 0 | 2 | 0 | 0 | 1 | 0 | 0 | 0 | 0 | 0 | 0 | 2 | 0 |
| N-Thiazolinyl-(2)-α-(4-chlorphenoxy)-propionic acid amide | 10 | 10 | 0 | 0 | 0 | 0 | 0 | 0 | 0 | 0 | — | 0 | — | — | — | — | — | — | 5 | 0 |
| N-Thiazolinyl-(2)-α-(2,4-dichlorphenoxy)-propionic acid amide | — | — | 0 | 0 | 0 | 0 | 0 | 0 | 0 | 0 | 0 | 1 | 0 | 0 | 0 | 0 | 0 | 1 | 0 |
| N-Thiazolinyl-(2)-α-(2,4,5-trichlorphenoxy)-propionic acid amide | — | — | 0 | 0 | 0 | 0 | 0 | 0 | 0 | 0 | 0 | 3 | 1 | 0 | 1 | 0 | 0 | 1 | 0 |
| N-Thiazolinyl-(2)-α-(2-methyl-4-chlorphenoxy)-propionic acid amide | — | — | 0 | 0 | 0 | 0 | 0 | 0 | 0 | 1 | 0 | 0 | 0 | 0 | 0 | 0 | 1 | 1 | 0 |
| N-Thiazolyl-(2)-4-chlorphenoxyacetamide | 10 | 10 | 0 | 0 | 0 | 0 | 0 | 2 | 0 | 5 | 1 | 0 | 0 | 0 | 5 | 3 | 0 | 0 |
| N-Thiazolyl-(2)-2,4-dichlorphenoxyacetamide | 10 | 10 | 0 | 2 | 1 | 0 | 1 | — | 0 | — | — | 1 | 0 | — | 0 | 1 | 1 | 0 | 0 |
| N-Thiazolyl-(2)-2,4,5-trichlorphenoxyacetamide | 10 | — | 0 | 0 | 0 | 0 | 0 | 0 | 2 | — | 0 | — | 4 | 0 | 0 | 3 | 0 | — | — |

−Continued

| A | B | C | D | E | F | G | H | I | K | L | M | N | O | P | Q | R | S | T | U |
|---|---|---|---|---|---|---|---|---|---|---|---|---|---|---|---|---|---|---|---|
| N-Thiazolyl-(2)-(2-methyl-4-chlorphenoxy)-acetamide | 10 | 10 | 0 | 0 | 0 | 0 | 1 | 2 | 0 | — | — | 4 | 5 | 4 | 2 | 1 | 3 | — | — |
| N-Thiazolyl-(2)-α-(4-chlorphenoxy)-propionic acid-amide | 10 | 10 | 1 | 4 | 3 | 2 | 2 | — | 2 | — | 3 | 0 | — | — | — | — | 5 | — | — |
| N-Thiazolyl-(2)-α-(2,4-dichlorphenoxy)-propionic acid-amide | 10 | — | 0 | 0 | 0 | 0 | 0 | 0 | 0 | 3 | 0 | 0 | 0 | 0 | 2 | 0 | 0 | 1 | 0 |
| N-Thiazolyl-(2)-α-(2,4,5-trichlorphen-Oxy)-prioionic acid-amide | 10 | — | 0 | 0 | 0 | 1 | 1 | 0 | 0 | — | 0 | — | 3 | 0 | 5 | 0 | 1 | — | — |
| N-Thiazolyl-(2)-α-(2-methyl-4-chlorphenoxy) propionic-acid-amide | 10 | — | 0 | 0 | 0 | 1 | 0 | 0 | 0 | 0 | 0 | 0 | 0 | 0 | 0 | 0 | 0 | 3 | 1 |
| Untreated | 10 | 10 | 10 | 10 | 10 | 10 | 10 | 10 | 10 | 10 | 10 | 10 | 10 | 10 | 10 | 10 | 10 | 10 | 10 |

0 = totally destroyed
10 = not damaged

EXAMPLE 2

In the greenhouse, millet (*Echinochloa crus galli*) and water rice were seeded in pots filled with soil.

After the emergence of the millet and rice plants, their development to the 2–3 leaf stage was awaited. Then the pots were placed under water to a depth of 6 cm, so that the millet and rice plants stood under water in greater or lesser part. After the flooding, an area spraying was carried out with the active substances listed below in a quantity of 1 kg of active substance per hectare, suspended or dissolved in 500 liters of water/ha. Also after the spraying, the flooding was maintained to the end of the experiment. Two weeks after the treatment, the degree of damage of the plants was rated, according to the rating scheme 0 – 10, where 0 means totally destroyed and 10 not damaged.

As is evident from the table, the compounds according to the invention proved clearly superior to standard agents tested by comparison in their herbicidal action on millet and their compatibility with rice.

| Compounds according to invention | Rice | Millet |
|---|---|---|
| N-thiazolinyl-(2)-2,4-dichloro-phenoxyacetamide | 10 | 0 |
| N-thiazolinyl-(2)-(2-methyl-4-chlorophenoxy)-acetamide | 10 | 0 |
| N-thiazolyl-(2)-2,4-dichloro-phenoxyacetamide | 10 | 0 |
| N-thiazolyl-(2)-(2-methyl-4-chlorophenoxy)-acetamide | 10 | 0 |
| Comparative agent | | |
| 2,4-dichlorphenoxyacetic acid | 8 | 9 |
| 2-methyl-4-chlorphenoxyacetic acid | 7 | 9 |
| α-(4-chloro-2-methylphenoxy)-propionic acid | 8 | 9 |
| 2,4,5-trichlorphenoxyacetic acid | 9 | 8 |
| S-ethyl-hexahydro-1-H-azepin-1-carbothiate | 10 | 3 |
| 2,4,5-trichlorphenoxyacetic acid amide | 7 | 7 |

0 = totally destroyed
10 = not damaged

EXAMPLE 3

In the greenhouse, the test plants listed in the following table were treated by the pre-emergence method with the agents to be used according to the invention at a dose of 3 kg of active substance per hectare. The agents were sprayed uniformly as aqueous suspension in 500 liter/ha.

The findings show that the agents according to the invention have a broad spectrum of action.

A - Compounds according to invention
B - Corn
C - Potato
D - Cotton
E - Alfalfa
F - Cucumber
G - Onion
H - Carrot
I - Beet
K - Cauliflower
L - Setaria italica
M - Echinochloa crus galli
N - Ipomoea purpurea
O - Chrysanthemum segetum
P - Amaranthus retroflexus
Q - Centaurea cyanus
R - Lamium amplexicaule
S - Matricaria chamomilla
T - Senecio vulgaris
U - Stellaria media

| A | B | C | D | E | F | G | H | I | K | L | M | N | O | P | Q | R | S | T | U |
|---|---|---|---|---|---|---|---|---|---|---|---|---|---|---|---|---|---|---|---|
| N-Thiazolyl-(2)-4-chlorphenoxyacetic acid-N-methylamide | 10 | 10 | 5 | 0 | 0 | 0 | 0 | 3 | 0 | 0 | 1 | 0 | 0 | 1 | 1 | 1 | 0 | 0 | 1 |
| N-thiazolyl-(2)-2,4-dichlorphenoxyacetic acid-N-methylamide | 10 | — | 1 | 0 | 1 | 1 | 1 | 0 | 0 | 0 | 0 | 0 | 0 | 0 | 0 | 0 | — | 1 | 1 | 5 |
| N-4-Methyl-thiazolyl-(2)-4-chlorphenoxy-acetic-acid-amide | 8 | — | 0 | 0 | 0 | 1 | 0 | 0 | 0 | 0 | 0 | 0 | 0 | 0 | 0 | 0 | 0 | 0 | 0 | 3 |
| N-4-Methyl-thiazolyl-(2)-2,4-dichlorphenoxy-acetic-acid-amide | 10 | 10 | — | 0 | 1 | 1 | 0 | 1 | 0 | 1 | 2 | 0 | 0 | 0 | 0 | — | 0 | 0 | 5 |

-Continued

| A | B | C | D | E | F | G | H | I | K | L | M | N | O | P | Q | R | S | T | U |
|---|---|---|---|---|---|---|---|---|---|---|---|---|---|---|---|---|---|---|---|
| N-4-Methyl-thiazolyl-(2)-(2-methyl-4-chlorphenoxy)-acetic acid amide | 10 | 10 | — | 0 | 4 | 1 | 0 | 1 | 1 | — | — | 2 | 1 | — | 4 | 5 | 3 | 5 | — |
| N-4-Methyl-thiazolyl-(2)-4-chlorphenoxy-acetic acid-N-methyl-amide | 10 | — | — | 2 | 1 | 1 | 1 | 3 | 0 | 4 | 0 | 0 | 1 | 0 | — | 3 | 0 | 0 | — |
| N-Thiazolyl-(2)-α-(2-methyl-4-chlorphenoxy)-propionic acid-N-methylamide | 10 | — | 4 | 0 | 0 | 1 | 1 | 0 | 0 | — | 3 | 0 | 0 | 4 | 0 | 1 | 3 | 2 | 1 |
| N-4-Methyl-thiazolyl-(2)-α-(2,4-dichlor-phenoxy)-propionic acid amide | 10 | 10 | — | 1 | 2 | 3 | 2 | 2 | 1 | — | 5 | 0 | 3 | 1 | 3 | 2 | 4 | 5 | 2 |
| N-4-Methyl-thiazolyl-(2)-α-(2-methyl-4-chlorphenoxy)-propionic acid amide | — | — | 0 | 0 | 1 | 1 | 1 | 1 | 0 | — | 2 | 0 | 0 | 2 | 1 | 1 | 3 | 0 | 1 |
| N-4-Methyl-thiazolyl-(2)-α-(2-methyl-4-chlorphenoxy)-propionic acid-N-methylamide | 10 | — | — | 3 | 4 | — | — | 1 | 1 | — | — | — | — | — | — | — | — | — | 2 |
| N-2-Thiazolinyl-(2)-4-chlorphenoxyacetic acid-N-methylamide | 10 | 7 | 0 | 0 | 0 | 0 | 0 | 0 | 0 | 0 | 0 | 0 | 0 | 1 | 0 | 0 | 0 | 1 | 3 |
| N-2-Thiazolinyl-(2)-2,4-dichlorphenoxyacetic acid-N-methylamide | 10 | — | 0 | 0 | 0 | 0 | 0 | 0 | 0 | 0 | 0 | 0 | 2 | 0 | 0 | 0 | 0 | 1 |
| N-Thiazolyl-(2)-2,4-dichlorphenoxyacetic acid-N-ethylamide | 10 | 10 | 6 | 0 | 2 | 0 | 1 | 1 | 1 | 1 | — | 1 | 0 | 5 | 0 | 0 | 3 | — | — |
| N-Thiazolyl-(2)-α-(2,4-dichlorphenoxy)-propionic acid-N-ethyl-amide | 10 | 10 | 1 | 0 | 1 | 0 | 0 | 0 | 0 | — | 3 | — | 1 | 1 | 0 | 1 | 1 | 3 | 1 |

0 = totally destroyed
10 = not damaged

EXAMPLE 4

In the greenhouse, millet (*Echinochloa crus galli*) and water rice were seeded in pots filled with soil.

After the emergence of the millet and rice plants, their development to the 2–3 leaf stage was awaited. Then the pots were placed under water to a depth of 6 cm, so that the millet and rice plants stood under water in greater and lesser part. After the flooding, an area spraying was carried out with the listed active substances in a quantity of 1 kg of active substance per hectare, suspended or respectively dissolved in 500 liter water/ha. Also after spraying the flooding was maintained to the end of the experiment. Two weeks after the treatment, the degree of damage of the plants was determined and rated according to the rating code 0 – 10 with 0 = totally destroyed and 10 = not damaged.

As is evident from the following table, the compounds according to the invention proved clearly superior to standard agents tested for comparison in their herbicidal action on millet and in their compatibility with rice.

| Compounds according to invention | Rice | Millet |
|---|---|---|
| 1. N-Thiazolyl-(2)-4-chlorophenoxyacetic acid-N-methylamide | 10 | 1 |
| 2. N-Thiazolyl-(2)-2,4-dichlorophenoxy-acetic acid-N-methylamide | 10 | 1 |
| 3. N-4-Methyl-thiazolyl-(2)-4-chloro-phenoxy-acetic acid amide | 10 | — |
| 4. N-4-Methyl-thiazolyl-(2)-2,4-dichlorophenoxyacetic acid amide | 10 | 0 |
| 5. N-4-Methyl-thiazolyl-(2)-(2-methyl-4-chlorophenoxy)-acetic acid amide | 10 | 0 |
| 6. N-4-Methyl-thiazolyl-(2)-chloro-phenoxy-acetic acid-N-methylamide | 10 | 3 |
| 7. N-4-Methyl-thiazolyl-(2)-2,4-dichlorophenoxy-acetic acid-N-methylamide | 10 | — |
| 8. N-4-Methyl-thiazolyl-(2)-(2-methyl-4-chlorophenoxy)-acetic acid-N-methylamide | 10 | — |
| 9. N-4-Methyl-thiazolyl-(2)-2,4-dichlorophenoxy-acetic acid-N-ethylamide | 10 | 0 |
| 10. N-4-Methyl-thiazolyl-(2)-(2-methyl-4-chloro-phenoxy)-acetic acid-N-ethylamide | 10 | 0 |
| 11. N-Thiazolyl-(2)-α-(2-methyl-4-chloro-phenoxy)-propionic acid-N-methylamide | 10 | 0 |
| 12. N-4-Methyl-thiazolyl-(2)-α-(2,4-dichlorophenoxy)-propionic acid amide | 10 | 0 |
| 13. N-4-Methyl-thiazolyl-(2)-α-(2-methyl-4-chlorophenoxy)-propionic acid-N-methylamide | 10 | 4 |

| Compounds according to invention | Rice | Millet |
|---|---|---|
| 14. N-2-Thiazolinyl-(2)-4-chlorophenoxy-acetic acid-N-methylamide | 10 | — |
| 15. N-2-Thiazolinyl-(2)-2,4-dichloro-phenoxyacetic acid-N-methylamide | 8 | 3 |
| 16. N-4-Methyl-thiazolyl-(2)-α-(2-methyl-4-chlorophenoxy)-propionic acid amide | 10 | — |
| 17. N-Thiazolyl-(2)-2,4-dichlorophenoxy-acetic acid-N-allylamide | 10 | 1 |
| 18. N-4-Methyl-thiazolyl-(2)-2,4-dichloro-phenoxy-acetic acid-N-allylamide | 10 | 1 |
| 19. N-4-Methyl-thiazolyl-(2)-α-(2,4-dichloro-phenoxy)-propionic acid-N-allylamide | 10 | 2 |
| 20. N-Thiazolyl-(2)-α-(2,4-dichlorophenoxy)-propionic acid-N-allylamide | 10 | 2 |
| Comparative agents | | |
| 2,4,5-trichlorophenoxyacetic acid amide | 7 | 7 |
| α-(4-chloro-2-methylphenoxy)-propionic acid | 8 | 10 |
| 2-methyl-4-chlorophenoxyacetic acid | 6 | 7 |
| 2,4-dichlorophenoxyacetic acid | 5 | 7 |

0 = totally destroyed
10 = not damaged

We claim:

1. A herbicidal compound of the formula

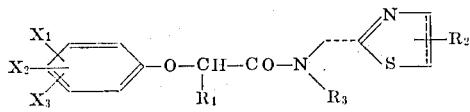

wherein
$R_1$ is hydrogen or methyl;
$R_2$ is hydrogen or lower alkyl;
$R_3$ is hydrogen, lower alkyl, or lower alkenyl;
$X_1$, $X_2$, and $X_3$ are equal or different and are hydrogen, lower alkyl, or halogen; and
said lower alkyl and lower alkenyl having up to four carbon atoms and wherein the dotted line represents and optional bond.

2. A herbicidal compound as set forth in claim 1, wherein $R_2$ is hydrogen or methyl, $R_3$ is hydrogen, methyl, ethyl or allyl, $X_1$ is hydrogen or chlorine, $X_2$ is hydrogen or chlorine, and $X_3$ is hydrogen, methyl, or chlorine.

3. A herbicidal compound as set forth in claim 2, wherein $R_2$ is hydrogen.

4. A compound as set forth in claim 1 which is N-thiazolinyl-(2)-4-chlorophenoxyacetamide.

5. A compound as set forth in claim 1 which is N-thiazolinyl-(2)-2,4-dichlorophenoxyacetamide.

6. A compound as set forth in claim 1 which is N-thiazolinyl-(2)-2,4,5-trichlorophenoxyacetamide.

7. A compound as set forth in claim 1 which is N-thiazolinyl-(2-(2-methyl-4-chlorophenoxy)-acetamide.

8. A compound as set forth in claim 1 which is N-thiazolinyl-(2)-α-(4-chlorophenoxy)-propionic acid amide.

9. A compound as set forth in claim 1 which is N-thiazolinyl-(2)-α-(2,4-dichlorophenoxy)-propionic acid amide.

10. A compound as set forth in claim 1 which is N-thiazolinyl-(2)-α-(2,4,5-trichlorophenoxy)-propionic acid amide.

11. A compound as set forth in claim 1 which is N-thiazolinyl-(2)-α-(2-methyl-4-chlorophenoxy)-propionic acid amide.

12. A compound as set forth in claim 1 which is N-thiazolyl-(2)-4-chlorophenoxyacetamide.

13. A compound as set forth in claim 1 which is N-thiazolyl-(2)-2,4-dichlorophenoxyacetamide.

14. A compound as set forth in claim 1 which is N-thiazolyl-(2)-2,4,5-trichlorophenoxyacetamide.

15. A compound as set forth in claim 1 which is N-thiazolyl-(2)-(2-methyl-4-chlorophenoxy)-acetamide.

16. A compound as set forth in claim 1 which is N-thiazolyl-(2)-α-(4-chlorophenoxy)-propionic acid amide.

17. A compound as set forth in claim 1 which is N-thiazolyl-(2)-α-(2,4-dichlorophenoxy)-propionic acid amide.

18. A compound as set forth in claim 1 which is N-thiazolyl-(2)-α-(2,4,5-trichlorophenoxy)-propionic acid amide.

19. A compound as set forth in claim 1 which is N-thiazolyl-(2)-α-(2-methyl-4-chlorophenoxy)-propionic acid amide.

20. A compound as set forth in claim 1 which is N-thiazolyl-(2)-4-chlorophenoxyacetic acid-N-methylamide.

21. A compound as set forth in claim 1 which is N-thiazolyl-(2)-2,4-dichlorophenoxyacetic acid-N-methylamide.

22. A compound as set forth in claim 1 which is N-4-methyl-thiazolyl-(2)-4-chlorophenoxyacetic acid amide.

23. A compound as set forth in claim 1 which is N-4-methyl-thiazolyl-(2)-2,4-dichlorophenoxyacetic acid amide.

24. A compound as set forth in claim 1 which is N-4-methyl-thiazolyl-(2)-(2-methyl-4-chlorophenoxy)-acetic acid amide.

25. A compound as set forth in claim 1 which is N-4-methyl-thiazolyl-(2)-4-chlorophenoxyacetic acid-N-methylamide.

26. A compound as set forth in claim 1 which is N-4-methyl-thiazolyl-(2)-2,4-dichlorophenoxyacetic acid-N-methylamide.

27. A compound as set forth in claim 1 which is N-4-methyl-thiazolyl-(2)-(2-methyl-4-chlorophenoxy)-acetic acid-N-methyl amide.

28. A compound as set forth in claim 1 which is N-4-methyl-thiazolyl-(2)-2,4-dichlorophenoxyacetic acid-N-ethylamide.

29. A compound as set forth in claim 1 which is N-4-methyl-thiazolyl-(2)-(2-methyl-4-chlorophenoxy)-acetic acid-N-ethyl amide.

30. A compound as set forth in claim 1 which is N-thiazolyl-(2)-α-(2-methyl-4-chlorophenoxy)-propionic acid-N-methyl amide.

31. A compound as set forth in claim 1 which is N-4-methyl-thiazolyl-(2)-α-(2,4-dichlorophenoxy)-propionic acid amide.

32. A compound as set forth in claim 1 which is N-4-methyl-thiazolyl-(2)-α-(2-methyl-4-chlorophenoxy)-propionic acid amide.

33. A compound as set forth in claim 1 which is N-4-methyl-thiazolyl-(2)-α-(2-methyl-4-chlorophenoxy)-propionic acid-methylamide.

34. A compound as set forth in claim 1 which is N-4-methyl-thiazolyl-(2)-α-(2-methyl-4-chlorophenoxy)-propionic acid-N-ethylamide.

35. A compound as set forth in claim 1 which is N-4-methyl-thiazolyl-(2-α-(2-methyl-4-chlorophenoxy)-propionic acid-N-allylamide.

36. A compound as set forth in claim 1 which is N-2-thiazolinyl-(2)-4-chlorophenoxyacetic acid-N-methylamide.

37. A compound as set forth in claim 1 which is N-2-thiazolinyl-(2)-2,4-dichlorophenoxyacetic acid-N-methylamide.

38. A compound as set forth in claim 1 which is N-thiazolyl-(2)-2,4-dichlorophenoxyacetic acid-N-ethylamide.

39. A compound as set forth in claim 1 which is N-thiazolyl-(2)-2,4-dichlorophenoxyacetic acid-N-allylamide.

40. A compound as set forth in claim 1 which is N-4-methyl-thiazolyl-(2)-2,4-dichlorophenoxyacetic acid-N-allylamide.

41. A compound as set forth in claim 1 which is N-4-methyl-thiazolyl-(2)-α-(2,4-dichlorophenoxy)-propionic acid-N-allylamide.

42. A compound as set forth in claim 1 which is N-thiazolyl-(2)-α-(2,4-dichlorophenoxy)-propionic acid-N-allylamide.

43. A compound as set forth in claim 1 which is N-thiazolyl-(2)-α-(2,4-dichlorophenoxy)-propionic acid-N-ethylamide.

\* \* \* \* \*